(12) United States Patent
Schlosser et al.

(10) Patent No.: US 9,025,876 B2
(45) Date of Patent: May 5, 2015

(54) METHOD AND APPARATUS FOR MULTI-LABEL SEGMENTATION

(71) Applicant: Thomson Licensing, Issy de Moulineaux (FR)

(72) Inventors: Markus Schlosser, Hannover (DE); Bjoern Scheuermann, Ronnenberg (DE); Bodo Rosenhahn, Ronnenberg (DE)

(73) Assignee: Thomson Licensing, Issy les Moulineaux (FR)

( * ) Notice: Subject to any disclaimer, the term of this patent is extended or adjusted under 35 U.S.C. 154(b) by 273 days.

(21) Appl. No.: 13/786,347

(22) Filed: Mar. 5, 2013

(65) Prior Publication Data
US 2013/0230247 A1    Sep. 5, 2013

(30) Foreign Application Priority Data
Mar. 5, 2012  (EP) .................................... 12305263

(51) Int. Cl.
*G06K 9/62* (2006.01)
*G06T 7/00* (2006.01)

(52) U.S. Cl.
CPC ............ *G06K 9/6267* (2013.01); *G06T 7/0081* (2013.01); *G06T 7/0093* (2013.01); *G06T 2207/20072* (2013.01)

(58) Field of Classification Search
USPC .................................. 382/173, 180, 218, 284
See application file for complete search history.

(56) References Cited

U.S. PATENT DOCUMENTS

| 7,822,274 B2 | 10/2010 | Sinop et al. |
| 7,885,463 B2 | 2/2011 | Zhang et al. |
| 8,103,093 B2 | 1/2012 | Blake et al. |

FOREIGN PATENT DOCUMENTS

GB    2430826    4/2007

OTHER PUBLICATIONS

Chaabane, Salim Ben, et al, "Relevance of the Dempster-Shafer Evidence Theory for Image Segmentation", Signals, Circuits and Systems (SCS), 2009 3rd International Conference on, IEEE, Piscataway, NJ, USA, Nov. 6, 2009, pp. 1-4.
Kim, T., et al., "Variable grouping for energy minimization", Computer Vision and Pattern Recognition (CVPR), 2011 IEEE Conference on, IEEE, Jun. 20, 2011, pp. 1913-1920.
Scheuermann, Bjorn, et al., "Feature Quarrels: The Dempster-Shafer Evidence Theory for Image Segmentation Using a Variational Framework", In: "Field Programmable Logic and Application", Nov. 8, 2010, Springer Berlin Heidelberg, Berlin, Heidelberg, vol. 6493, pp. 426-439.
Scheuermann, Bjorn, et al., "Interactive Image Segmentation Using Level Sets and Dempster-Shafer Theory of Evidence" In: "Field Programmable Logic and Application", May 1, 2011, Springer Berlin Heidelberg, Berlin, Heidelberg, vol. 6688, pp. 656-665.

(Continued)

*Primary Examiner* — Duy M Dang
(74) *Attorney, Agent, or Firm* — International IP Law Group, PLLC

(57) ABSTRACT

A method and an apparatus for multi-label segmentation of an image are described. First an energy function is determined for the image. Then for a homogeneous region of the image variables of the energy function are grouped to a single variable. Subsequently the energy function is minimized and labels are assigned to regions of the image based on the minimized energy function.

10 Claims, 6 Drawing Sheets

(56) References Cited

OTHER PUBLICATIONS

Scheuermann, Bjorn, et al., "SlimCuts: GraphCuts for High Resolution Images Using Graph Reduction", In: Energyminimization Methods in Computer Vision and Pattern Ecognition, Jul. 25, 2011, Springer Berlin Heidelberg, Berlin, Heidelberg, vol. 6819, pp. 219-232.

Bhusnurmath, et al., "Graph cuts via l1 norm minimization", Transactions on Pattern Analysis and Machine Intelligence, vol. 30, No. 10, Jan. 10, 2008, pp. 1866-1871.

Blake, et al., "Interactive image segmentation using an adaptive GMMRF model", Proceedings of European Conference Computer Vision (2004), vol. 3012, pp. 428-441.

Boykov, et al., "An Experimental Comparison of Min-Cut_Max-Flow Algorithms for Energy Minimization in Vision", IEEE Transactions on PAMI, vol. 26 (Sep. 2004), pp. 1124-1137.

Boykov, et al., "Computing geodesics and minimal surfaces via graph cuts", International Conference on Computer Vision, Nice, France, (Oct. 2003), pp. 26-33.

Boykov, et al., "Fast approximate energy minimization via graph cuts", IEEE Transactions on PAMI, vol. 23 (2002), pp. 1222-1239.

Boykov, et al., "Interactive Graph Cuts for Optimal Boundary and Region Segmentation of Objects in N-D Images", Proceedings of International Conference on Computer Vision, Vancouver, Canada, vol. 1 (Jul. 2001), pp. 105-112.

Chunjiang, et al., "Color Image Edge Detection using Dempster-Shafer Theory", 2009 International Conference on Artificial Intelligence and Computational Intelligence, Shanghai, China, Nov. 7, 2009, pp. 476-479.

Comaniciu, et al., "Mean shift—A robust approach toward feature space analysis", IEEE Transactions on Pattern Analysis and Machine Intelligence, vol. 24, No. 5 (May 2002), pp. 603-619.

Delong, et al., "A scalable graph-cut algorithm for N-D grids", IEEE Conference on Computer Vision and Pattern Recognition, Anchorage Alaska (Jun. 2008), pp. 1-8.

Dempster, A., "A generalization of Bayesian inference", Journal of the Royal Statistical Society, Series B, vol. 30 (Feb. 14, 1968), pp. 205-247.

Felzenszwalb, et al., "Efficient graph-based image segmentation", International Journal of Computer Vision, vol. 59, No. 2 (Sep. 2004), pp. 167-181.

Anonymous, "Image and Video Editing", http://research.microsoft.com/en-us/um/cambridge/p . . . , (Feb. 2012), pp. 1-2.

Anonymous, "Particle Video", http://rvsn.csail.mit.edu/pv/, (Feb. 2011), pp. 1-2.

Anonymous, "The Berkeley Segmentation Dataset and Benchmark", http://www.eecs.berkeley.edu/Research/Projects/CS/ . . . , (Jun. 2007), pp. 1-4.

Anonymous, "Recognition of human actions", http://www.nada.kth.se/cvap/actions, (Feb. 2012), pp. 1-2.

Kohli, et al., "Efficiently solving dynamic Markov random fields using graph cuts", International Conference on Computer Vision, vol. 2 (May 2005), pp. 922-929.

Kohli, et al., "Uncertainty driven multi-scale optimization", DAGM, (Apr. 2010), pp. 242-251.

Komodakis, N., "Towards more efficient and effective LP-based algorithms for MRF optimization", Proceedings of European Conference Computer Vision (2010), pp. 520-534.

Lempitsky, et al., "Global optimization for shape fitting", IEEE Conference on Computer Vision and Pattern Recognition, Minneapolis, MN (Jun. 2007), pp. 1-8.

Levinshtein, et al., "Turbopixels-Fast superpixels using geometric flows", IEEE Transactions on Pattern Analysis and Machine Intelligence, vol. 31, No. 12 (Dec. 2009), pp. 2290-2297.

Park, et al., "Applying enhanced confusion line color transform using color segmentation for mobile applications", 2011 First ACIS/JNU International Conference on Computers, Networks, Systems and Industrial Engineering (CNSI), May 23, 2011, pp. 40-44.

Puzicha, et al., "Multiscale annealing for grouping and unsupervised texture segmentation", International Journal of Computer Vision and Image Understanding, vol. 76 (Dec. 1999), pp. 213-230.

Rother, et al., "Grabcut-Interactive foreground extraction using iterated graph cuts", SIGGRAPH 23 (2004), pp. 309-314.

Sand, et al., "ParticleVideo-Long-range motion estimation using point trajectories", IEEE Conference on Computer Vision and Pattern Recognition (2006), pp. 2195-2202.

Schuldt, et al., "Recognizing human actions—A local SVM approach", International Conference on Pattern Recognition (2004), pp. 32-36.

Shafer, G., "A mathematical theory of evidence", Princeton university press (1976), pp. 667-672.

Sinop, et al., "Accurate banded graph cut segmentation of thin structures using Laplacian pyramids", Proceedings of Medical Image Computing and Computer-Assisted Intervention, (Oct. 2006), pp. 896-903.

Veksler, et al., "Superpixels and supervoxels in an energy optimization framework", Proceedings of European Conference Computer Vision (2010), pp. 211-224.

Chaabane, et al., "Dempster-Shafer evidence theory for image segmentation-application in cells images", International Journal of Signal Processing, vol. 35 (Nov. 29, 2009), pp. 606-612.

Adamek, et al., "Using Dempster-Shafer Theory to fuse Multiple Information Sources in Region-Based Segmentation", ICIP 2007, pp. 11-269-272.

METHOD AND APPARATUS FOR MULTI-LABEL SEGMENTATION

This application claims the benefit, under 35 U.S.C. §119 of EP Patent Application 12305263.1, filed 5 Mar. 2012 and EP Patent Application 12306131.9 filed 19 Sep. 2012.

FIELD OF THE INVENTION

The invention relates to a method and an apparatus for multi-label segmentation of an image or a sequence of images. More specifically, the invention refers to a method and an apparatus for multi-label segmentation of an image or a sequence of images using graph cuts, which is suitable for high resolution images or image sequences.

BACKGROUND OF THE INVENTION

In the field of computer vision, discrete optimization using maximum flow algorithms has become very popular. This has been driven by the fact that many problems, such as image segmentation, stereo matching or shape matching, are formulated using probabilistic models like Markov random fields (MRF) or conditional random fields (CRF). The computation of the maximum a posteriori (MAP) solution for these models can be regarded as the discrete minimization of an energy function. Many algorithms in literature are able to efficiently compute an approximate solution of the given optimization problem. Under some assumptions, e.g. that the energy function is submodular, these algorithms are able to compute the exact minimum of the given energy function.

Research on solving discrete optimization problems using maximum flow/minimum cut algorithms for applications in computer vision can be divided into the following approaches:

Augmenting Paths:

For computer vision problems, the most widely used algorithm is the Boykov and Kolmogorov augmenting paths algorithm (BK-algorithm). This algorithm efficiently solves moderately sized 2D and 3D problems with low connectivity.

Push-Re-Label:

Most parallelized maximum flow/minimum cut algorithms are based on the push-re-label scheme. These methods outperform the traditional BK-algorithm for huge and highly connected grid graphs. Special hardware is used to approximate the optimal solution.

Grouping of Variables/Graph Sparsification:

Besides the approaches to develop more efficient algorithms for the maximum flow/minimum cut problem, researchers are also trying to reduce the size of the labeling problem or the graph itself. One simple and widely used technique merges variables in the energy function into a smaller number of groups, e.g. superpixels. For example, in B. Scheuermann et al.: "*Slimcuts: Graphcuts for high resolution images using graph reduction*", 8th International Conference on Energy Minimization Methods in Computer Vision and Pattern Recognition (EMMCVPR) (2011), pp. 219-232, an algorithm for graph sparsification is presented that does not change the optimal solution. The idea is to create a so called Slim Graph by merging nodes in the graph that do not change the maximum flow, meaning that these variables are guaranteed to have the same label in the minimum energy state.

Multi-Scale:

The idea of multi-scale methods for image labeling is to first solve the problem at low resolution using standard techniques. This can be interpreted as a grouping of the image into regular non-overlapping groups. The result of the low-resolution labeling is refined at the high-resolution in a following optimization step where most variables of the problem are fixed.

Unfortunately, in parallel to the improvement of discrete energy minimization algorithms, the size of single images and image sequences has increased significantly. Compared to standard benchmark images, which have an approximate size of 120.000 pixels, nowadays commercial cameras capture images with many more pixels, e.g. up to 20 million. Since most energy functions contain one discrete variable per pixel, e.g. energy functions for image segmentation or stereo matching, the minimization using maximum flow algorithms can be computationally extremely expensive. It has been shown that the given algorithms are not applicable if the data of the problem does not fit into the physical memory. Though more efficient energy minimization methods developed, the computational cost and memory requirements of these methods are still highly linear in the number of variables and terms of the energy function.

SUMMARY OF THE INVENTION

It is an object of the invention to propose an enhanced solution for multi-label segmentation of an image or a sequence of images, which has an improved performance.

According to the invention, a method for multi-label segmentation of an image comprises the steps of:
 determining an energy function for the image;
 grouping variables of the energy function for a homogeneous region of the image to a single variable;
 minimizing the energy function; and
 assigning labels to regions of the image based on the minimized energy function.

Accordingly, an apparatus for multi-label segmentation of an image is adapted to perform the steps of:
 determining an energy function for the image;
 grouping variables of the energy function for a homogeneous region of the image to a single variable;
 minimizing the energy function; and
 assigning labels to regions of the image based on the minimized energy function.

The proposed method merges variables of the energy function to small sets of non-overlapping groups, so that each group can be represented by one single variable. For minimizing the energy function is a maximum flow algorithm is used. The solution according to the invention has the advantage that the general performance of maximum flow algorithms for image segmentation is improved and that the computational costs and memory requirements are dramatically reduced. In contrast to other approaches no special hardware is necessary to approximate the optimal solution.

Advantageously Dempster's theory of evidence is used to determine which variables and/or which pixels of the image are grouped. For this purpose an edge weight function is defined between neighboring pixels of the image based on their appearance similarity and their task specific similarity. The appearance similarity and the task specific similarity are combined using Dempster's rule of combination.

For merging the task specific similarity and the appearance are combined using Dempster's theory of evidence to compute the basic believe if two neighboring variables should be merged. Furthermore, the size of the groups is not directly penalized in order to allow large groups of variables in homogeneous regions.

Preferably, two variables of the energy function are grouped if the maximum weight of all edges connected to the two variables is smaller than a threshold. Favorably, two variables of the energy function are also grouped if the value of the edge connecting the two variables or the maximum value of all edges connected to the two variables is smaller than the minimal internal difference of the two variables, which is defined as the maximum value of the minimal spanning tree plus a small value.

BRIEF DESCRIPTION OF THE DRAWINGS

For a better understanding the invention shall now be explained in more detail in the following description with reference to the figures. It is understood that the invention is not limited to this exemplary embodiment and that specified features can also be expediently combined and/or modified without departing from the scope of the present invention as defined in the appended claims. In the figures:

DETAILED DESCRIPTION OF PREFERRED EMBODIMENTS

Figure 1:
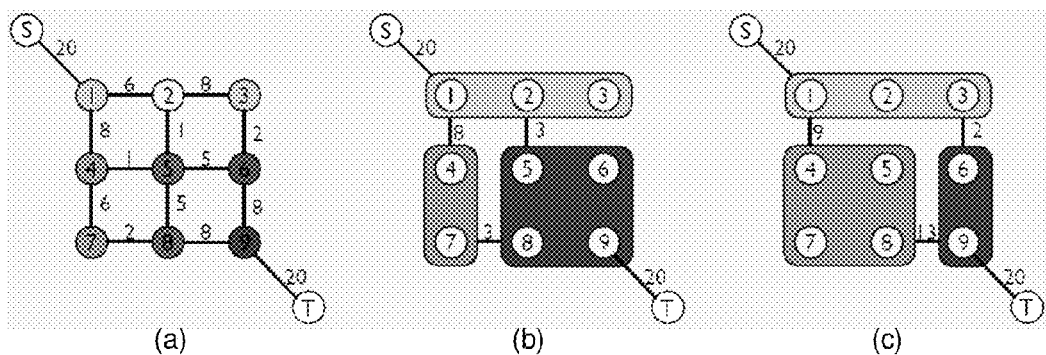
FIG. 1 shows an example of a variable grouping and a corresponding graph based on a new energy function.

The discrete energy E: $\mathcal{L}^n \to \mathbb{R}$ for the problem of binary image labeling addressed in this work can be written as the sum of unary $\phi_i$ and pairwise functions $\phi_{i,j}$ $$E(x) = \sum_{i \in \mathcal{V}} \varphi_i(x_i) + \sum_{(i,j) \in \varepsilon} \varphi_{i,j}(x_i, x_j), \qquad (1)$$

where x is the labeling, $\nu$ corresponds to the set of all image pixels and $\epsilon$ is the set of all edges between pixels in a defined neighborhood $\mathcal{N}$ (e.g. 4 or 8 neighborhood for images and 6 or 26 for image sequences). For the problem of binary image segmentation, the label set $\mathcal{L}$ consists of a foreground (fg) and a background (bg) label. The unary function $\phi_i$ is given as the negative log likelihood using a standard Gaussian Mixture Model (GMM), defined as $$\phi_i(x_i) = -\log Pr(I_i|x_i=S), \qquad (2)$$

where S is either fg or bg. The pairwise function $\phi_{i,j}$ takes the form of a contrast sensitive Ising model and is defined as $$\phi_{i,j}(x_i,x_j) = \gamma \cdot \text{dist}(i,j)^{-1} \cdot [x_i \neq x_j] \cdot \exp(-\beta \|I_i - I_j\|^2). \qquad (3)$$

Here $I_i$ and $I_j$ describe the feature vectors of pixels i and j, e.g. RGB-colors. The parameter $\gamma$ specifies the impact of the pairwise function. Using the defined unary and pairwise functions, the energy (1) is submodular and can hence be represented by a graph. In this form, the global minimum of the energy can be computed with standard maximum flow algorithms.

To solve the labeling problem using maximum flow algorithms, the energy function needs to be represented by a graph. This can be achieved by defining the graph $G=(\nu_G,\epsilon_G)$ as follows: The set of vertices is simply the set of pixels unified with two special vertices: $\nu_G = \nu \cup \{S,T\}$, where S denotes the source and T the sink. The set of edges consists of the set of all neighboring pixels plus an edge between each pixel and the source and sink respectively: $\epsilon_G = \epsilon \cup \{(p,S), (p,T) | p \in \nu\}$. The capacities c(e) of each edge are defined analogously to Y. Boykov et al: "*Interactive graph cuts for optimal boundary & region segmentation of objects in nd images*" Proceedings of the Eighth International Conference On Computer Vision (ICCV-01) (2001), Vol. 1, pp. 105-112.

For the grouping of the variables the definitions given in T. Kim et al.: "*Variable grouping for energy minimization*", Conference on Computer Vision and Pattern Recognition (CVPR) (2011), pp. 1913-1920 are adapted to the notation as used herein. A variable grouping of graph G is a graph $G'=(\nu'_G, \epsilon'_G)$ with energy function E' produced by a surjective map $m_G: \nu_G \to \nu'_G$ and the edge set $\epsilon'_G = \{(s,t) \in \nu'_G \times \epsilon'_G | \exists (i,j) \in \epsilon_G: m_G(i)=s \text{ and } m_G(j)=t\}$. Thus, the energy function for a variable grouping G' reads:

$$E'(x) = \sum_{i \in \mathcal{V}} \varphi_i(\hat{x}_{m_G(i)}) = \sum_{(i,j) \in \varepsilon} \varphi_{i,j}(\hat{x}_{m_G(i)}, \hat{x}_{m_G(j)}), \qquad (4)$$

where $\hat{x}$ is the labeling of the variable grouping. Solving this energy function on top of the grouping can be seen to correspond to the existing practice of using superpixels as a preprocessing step and defining the energy minimization problem on superpixels instead of pixels. Since most superpixels are directly derived from image properties, they perform poorly because the properties of the energy function, e.g. the unary term, are ignored.

FIG. 1 shows an example of a variable grouping and the corresponding graph based on the proposed energy function. The nodes from the original graph illustrated in FIG. 1(a) are merged into three different groups of variables, as depicted in FIG. 1(b) and FIG. 1(c). The weights of the new graph are changed according to the new energy function. A good grouping as in FIG. 1(b) does not change the MAP solution of the original graph.

In the following Dempster's theory of evidence, also called evidence theory, shall be briefly reviewed. This theory will later be used to define a similarity weight for two neighboring variables.

Earlier works on image segmentation using Dempster's theory of evidence have shown that it can be advantageous. The evidence theory is often described as a generalization of the Bayesian theory to be able to represent inaccuracy and uncertainty information at the same time. The basic idea of the evidence theory is to define a so called mass function on a hypotheses set $\Omega$. The hypotheses set $\Omega$ shall be composed of n single mutually exclusive subsets $\Omega_i$, symbolized by $\Omega = \{\Omega_1, \Omega_2, \ldots, \Omega_n\}$. In order to express a degree of confidence for each element A of the power set $\wp(\Omega)$, an elementary mass function m(A) is associated with it to indicate all confidences assigned to this proposition. The mass function m is defined by:

$$m: \wp(\Omega) \to [0,1] \qquad (5)$$

and must fulfill the following conditions:

(i) $m(\emptyset) = 0$ (6)

(ii) $\sum_{A_n \subseteq \Omega} m(A_n) = 1.$

The quantity m(A) is interpreted as the belief strictly placed on hypothesis A. This quantity differs from a Bayesian probability function by the totality of the belief which is distributed not only on the simple classes, but also on the composed classes. This modeling shows the impossibility to dissociate several hypotheses. This characteristic is the principal advantage of the evidence theory, but it also represents the principal difficulty of this method.

From the basic belief assignment m, a belief function Bel: $\wp(\Omega) \to [0,1]$ can be defined as $$Bel(A) = \sum_{A_n \subseteq \Omega} m(A_n),$$ (7)

with $A_n \in \wp(\Omega)$. It is interpreted as the total belief committed to hypothesis A, that is, the mass of A itself plus the mass attached to all subsets of A. Bel(A) then is the total positive effect the body of evidence has on a value being in A. It quantifies the minimal degree of belief of the hypothesis A.

A particular characteristic of the Dempster-Shafer evidence theory (one which makes it different from probability theory) is that if Bel(A)<1, then the remaining evidence 1−Bel(A) needs not necessarily refute A (i.e. support its negation $\bar{A}$). That is, the so called additivity rule Bel(A)+Bel($\bar{A}$)=1 does not hold.

The Dempster-Shafer theory has an important operation, Dempster's rule of combination, for pooling of evidence from a variety of features. This rule aggregates two independent bodies of evidence defined within the same frame of discernment into one body of evidence. Let $m_1$ and $m_2$ be two mass functions associated to such independent bodies. The new body of evidence is defined by $$m(A) = m_1(A) \otimes m_2(A)$$ (8)

$$= \frac{\sum_{B \cap C = A} m_1(B) m_2(C)}{1 - \sum_{B \cap C = \emptyset} m_1(B) m_2(C)}.$$

Dempster's rule of combination computes a measure of agreement between two bodies of evidence concerning various propositions from a common frame of discernment. Since Dempster's rule of combination is associative, information coming from more than two feature channels can be combined.

In the following the details of the proposed approach are described and the similarities and differences to existing approaches are discussed. Consider a score function w measuring how similar two connected nodes are, such that small values indicate a strong similarity and large values dissimilarity. The idea of grouping nodes is as follows: (i) the first step is to sort all edges of the graph in ascending order so that edges with a small weight come first, (ii) for each edge in the list nodes that fulfill a given constraint are merged until the problem has been sufficiently reduced. The efficient graph-based segmentation method, proposed in P. F. Felzenszwalb et al.: "*Efficient graph-based image segmentation*", Int. J. Comput. Vis. Vol. 59 (2004), pp. 167-181, works exactly like this. As the merging constraint, they used a global criterion, balancing the size of the group and its internal coherence. Algorithm 1 presented below is identical to the solution P. F. Felzenszwalb et al. with the notation as used herein. The merging constraint used by P. F. Felzenszwalb et al. is based on the so called internal difference $$Int(C) = \max_{(i,j) \in MST(C,\varepsilon)} w_{i,j},$$ (9)

where MST(C,$\epsilon$) is the minimum-weight spanning tree within the group C with a set of edges $\epsilon$. Int(C) is small if the nodes in group C are similar according to the defined edge weights. To decide whether two groups are merged, the algorithm compares the weight of the connecting edge between the two groups $C_1$ and $C_2$ and compares it with the internal difference Int($C_i$) of both groups. For the present goal of grouping variables for energy minimization, this criterion makes sense since the intention is to build groups of variables that are similar and to agree about their labeling.

For the decision, P. F. Felzenszwalb et al. use the function $MInt(C_1,C_2)$ defined as $$MInt(C_1, C_2) = \min\{Int(C_1) + \tau(C_1), Int(C_2) + \tau(C_2)\},$$ (10)

where $$\tau(C) = \frac{k}{|C|}$$

penalizes the size of a group based on a free parameter k. According to Algorithm 1 an edge $w_{i,j} \in \epsilon_g$ has to fulfill the equation $$w_{i,j} \leq MInt(C_1, C_2)$$ (11)

to be merged. This graph based method is very efficient and easy to implement in $O(|\epsilon_g| \log |\epsilon_g|)$ time and memory.

---

Algorithm 1: Dempster-Shafer based Variable Grouping

```
1:  (v'_g, m) = DempsterShaferGrouping(G, φ, w)
2:  Input:
3:      G = (v_g, ε_g)     // an instance of the graph
4:      φ_i, φ_{i,j}      // node and edge energies
5:      w : ε_g → ℝ       // dissimilarity weights
6:  Output:
7:      v_g'    // set of grouped variables
8:      m       // surjective map
9:  Algorithm:
10:     v_g' ← v_g, ε_g' ← ε_g
11:     m ← {(i,i) | i ∈ v_g}
12:     π ← sort(ε_g, w) {sort weights in ascending order}
13:     for e = 1,...,|π| do
14:         (i,j) ← π_e
15:         if m(i) = m(j) then
16:             continue {already merged}
17:         end if
18:         if w_{ij} fulfills given constraint then
19:             merge C_i and C_j in m, v_g'
20:         end if
21:     end for
```

---

The grouping resulting from the algorithm by P. F. Felzenszwalb et al. can be described as compact since the free parameter k in τ(C) penalizes the size of a group. In the above cited work by T. Kim et al. the goal was to produce compact groups of variables that will have the same label according to the minimum energy state. Therefore, the weight functions are based on the unary or pairwise potentials of the energy function. In contrast the present goal is to group as many variables as possible that are likely to have the same label according to the minimum energy state and the ground truth labeling.

To allow big groups of variables, e.g. in homogeneous regions, new merging constraints based on the maximum weight of any outgoing edge are proposed. Instead of using a global criterion, balancing the size and the internal coherence of a group all nodes that are connected by a sufficiently small edge are merged. For example, one could use the function $w_{i,j} \leq W$ to merge all nodes connected by an edge smaller than the parameter W. As will later be shown with reference to the experiments this simple constraint does not produce groups that agree with either the minimum energy state or the ground truth. To produce groups of homogeneous variables, two new merging constraints based on the local edge weights of two nodes are proposed. The first constraint takes into account the maximum value of any edge connected to two variables. Therefore, two components connected by the edge $w_{i,j}$ are grouped if $$w_{max}(i,j) := \max_{l,k | (l,j),(i,k) \in \varepsilon_G} (w_{lj}, w_{ik}) \leq W_1 \text{ (MAXEDGE)}. \quad (12)$$

This means that two nodes are merged if all weights adjacent to (i,j), including the edge $w_{i,j}$, are smaller than the parameter $W_1$, which indicates that these nodes are somewhat similar. In the experiments the threshold $W_1$ is computed according to the partition of the edge weights. The idea of the proposed constraint is to have large groups of variables in all images regions except the borders of the objects. As a second constraint also the global criterion based on the minimum-weight spanning tree and the size dependent function $\tau$ are included, to balance the size of a group and its internal coherence, to allow somehow small compact groups of variables in regions that do not fulfill the MAXEDGE constraint, e.g. at the borders of an object. Thus, the decision is made according to $$\text{MAXEDGE or } w_{ij} \leq M\text{Int}(C_i, C_j)(\text{COMPACTEDGE}). \quad (13)$$

The differences of the proposed merging functions are discussed later with regard to the experiments.

Three classes of weight functions $w_{i,j}$ are considered. The first two are well known weight functions that shall serve as comparison with the proposed weight function. P. F. Felzenszwalb et al. take the pixel difference as the grouping weight. If $I_i$ and $I_j$ are the feature vectors of pixels i and j in the image, the weight is set to the norm of the difference:

$$w_{ij}^{FH} = \|I_i - I_j\|. \quad (14)$$

In the experiments on image segmentation it will be shown that this method is not performing comparably, since the properties from the energy minimization problem are ignored.

Kim et al. have proposed an approach very similar to the approach by P. F. Felzenszwalb et al. and to the present approach. For comparison with the proposed method the defined UNARYDIFF weight function is used, because in the experiments this weight function outperformed the others for the problem of binary image segmentation. The weight is defined as $$w_{ij}^{ud} = \|\phi_i - \phi_j\|, \quad (15)$$

using the unary terms of the defined energy function. The weight describes the disagreement of the states between two variables and measures the task-specific similarity of two neighboring nodes.

The Dempster-Shafer weighting function proposed herein includes the unary functions $\phi_i$ and $\phi_j$ and the pairwise terms $\phi_{ij}$. Thereby the image information that are included in the pairwise function and the information included in the unary term, typically derived from a discriminative classifier, are taken into account. Hence the proposed weight function can be seen as a combination of the two earlier presented ones, which combines the image features with the task specific unary functions. To combine both types of information Dempster's theory of evidence is used. Therefore, the weights are defined based on the unary and pairwise functions $$w_{ij}^{pairwise} = \phi_{ij}(x_i, x_j) \quad (16)$$

and $$w_{ij}^{unary} = \|\phi_i - \phi_j\|. \quad (17)$$

Since the co-domains of the weights are different, they are individually normalized to the co-domain [0,1]. That means for two variables with a similar feature vector $w_{ij}^{pairwise} \approx 1$. For $w_{ij}^{unary}$ it means $w_{ij}^{unary} \approx 0$ if the negative log likelihood for two variables is similar for both states. Based on these weight functions, two mass functions are defined over the hypothesis set $\Omega = \Omega_1, \Omega_2$), where $\Omega_1$ means that the two variables are similar and $\Omega_2$ that they are dissimilar:

$$m_1(\Omega_1) = b_1 \cdot w_{ij}^{pairwise}, m_1(\Omega_2) = b_1 \cdot (1 - w_{ij}^{pairwise}),$$

$$m_1(\emptyset) = 0, m_1(\Omega) = b_1$$

$$m_2(\Omega_1) = b_2 \cdot (1 - w_{ij}^{unary}), m_2(\Omega_2) = b_2 \cdot w_{ij}^{unary},$$

$$m_2(\emptyset) = 0, m_2(\Omega) = b_2, \quad (18)$$

where $b_i$ describes the believe that is put on the different information sources. In all experiments presented below the believe is equally weighted with $b_1 = b_2 = 0.5$. The two mass functions are now fused with Dempster's rule of combination (8) and the weights are defined as:

$$w_{ij}^{DS} = 1 - Bel(\Omega_1) \quad (19)$$

$$= 1 - m(\Omega_1)$$

$$= 1 - \left( \frac{m_1(\Omega_1) \cdot m_2(\Omega_1) + m_1(\Omega_1) \cdot m_2(\Omega) + m_1(\Omega) \cdot m_2(\Omega_1)}{1 - (m_1(\Omega_1) \cdot m_2(\Omega_2) + m_1(\Omega_2) \cdot m_2(\Omega_1))} \right).$$

Since Dempster's rule of combination is associative, other information sources can be easily included and combined with the proposed mass functions, e.g. the user initialization, the optical flow in video sequences or appearance information of an object.

Figure 2:
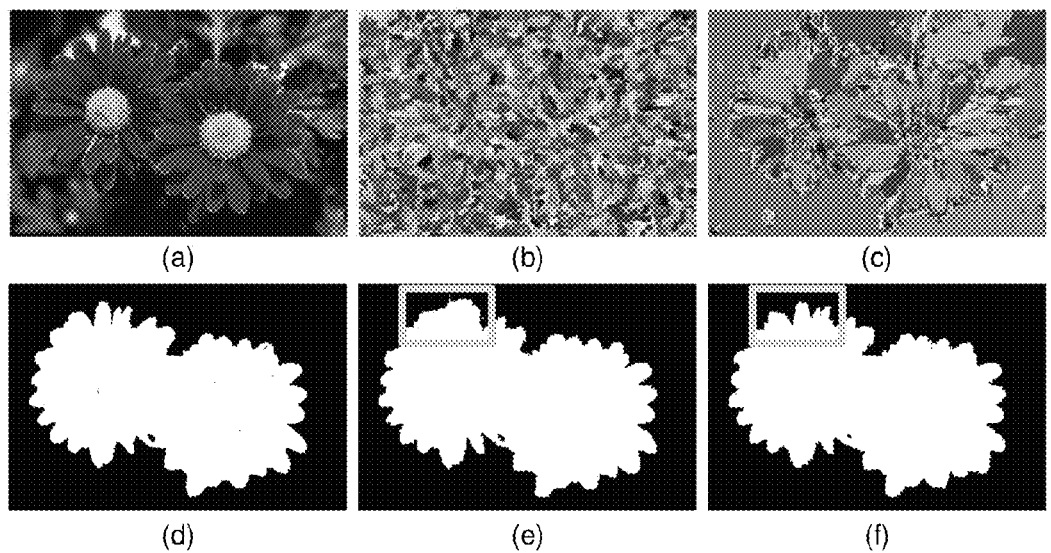
FIG. 2 depicts image segmentation results for different approaches for variable grouping.

FIG. 2 depicts the image segmentation results obtained with different approaches for variable grouping. FIGS. 2(a) and (d) show the original image and the corresponding MAP segmentation result, respectively. FIGS. 2(b) and (e) depict the variable grouping of Kim et al. with a budget of 1% and the corresponding segmentation result. Finally, FIGS. 2(c) and (f) show the variable grouping proposed herein (COMPACTEDGE) with a budget of 1% and the corresponding segmentation result.

The proposed grouping allows to compute an approximate segmentation. However, since the resulting graph for the energy minimization is much smaller the segmentation result differs from the original MAP solution. The proposed algorithm can be quantified using three performance measures: i) the segmentation quality with respect to the ground truth solution, ii) the ratio of runtimes solving the MAP-problem (including the time for the grouping), and iii) the minimum segmentation error of a grouping. In the following the three measures are described in detail.

Segmentation Error:

The segmentation error is defined as the ratio between the number of misclassified pixels and the number of pixels in unclassified regions:

$$R_{se}(x) = \frac{\sum_{i \in \mathcal{V}'_G} [x_i \neq x_i^{Gt}]}{no. \text{ unclassified pixels}}, \quad (20)$$

where $x^{gt}$ is the ground truth labeling.

Minimum Segmentation Error:

Another measure to quantify the quality of a grouping is given by the minimum segmentation error:

$$R_{mse}(x) = \sum_{i \in \mathcal{V}'_G} \min\left( \sum_{j \in m^{-1}_{\mathcal{V}'_G}(i)} [x_j^{gt} = fg], \sum_{j \in m^{-1}_{\mathcal{V}'_G}(i)} [x_j^{gt} = bg] \right). \quad (21)$$

It counts the minimum number of misclassified pixels by an optimal segmentation.

Ratio of Runtimes:

To compute the ration of runtimes the time to compute the grouping and to solve the reduced problem is compared with the time to solve the original problem.

The proposed method was evaluated using small scale images of the Microsoft segmentation benchmark available at http://research.microsoft.com/en-us/um/cambridge/projects/visionimagevideoediting/segmentation/grabcut.htm and http://www.eecs.berkeley.edu/Research/Projects/CS/vision/grouping/segbench/as well as large scale images with up to 26 million pixels. For the problem of binary video segmentation video sequences from the KTH action dataset available at http://www.nada.kth.se/cvap/actions/ and videos provided by Sand and Teller at http://http://rvsn.csail.mit.edu/pv/ were used. In all experiments the same energy function as proposed by Blake et al.: "*Interactive image segmentation using an adaptive gmmrf model*", European Conference on Computer Vision (ECCV) (2004), pp. 428-441, and the same set of parameters were used. The experiments were run on a MacBook Pro with 2.4 GHz Intel Core i5 processor and 4 GB Ram. For all experiments the proposed algorithm was compared with the approaches of P. F. Felzenszwalb et al. and Kim et al.

Small-scale Images: Table 1 shows the evaluation of the proposed algorithm on the Microsoft segmentation benchmark in comparison to the works of P. F. Felzenszwalb et al. (FH-algorithm) and Kim et al. (UNARYDIFF). All values are averaged over 50 benchmark images using stroke (lasso) initializations. It can be observed that the combination of Dempster's theory of evidence and the proposed constraint has a smaller average segmentation error with an even smaller budget. The small minimum segmentation error using the MAXEDGE constraint highlights that the idea to group large homogeneous regions to one single variable is advantageous and that the proposed weights based on Dempster's theory of evidence reliably find those regions. In combination with small groups at the objects boundaries the proposed COMPACTEDGE constraint outperforms the existing approaches.

TABLE 1

| Method | Avg. budget | Avg. $R_{mse}(x)$ | Avg. $R_{se}(x)$ |
|---|---|---|---|
| full MAP (reference) | 100 (100) | 0 (0) | 0.075 (0.058) |
| FH-algorithm | 10.22 (10.22) | 209.74 (209.74) | 0.074 (0.063) |
| UNARYDIFF | 10.72 (10.84) | 255.1 (219.08) | 0.073 (0.065) |
| MAXEDGE | 47.72 (15.21) | 58.42 (4.21) | 0.069 (0.058) |
| COMPACTEDGE | 6.25 (5.00) | 321.5 (63.52) | 0.061 (0.058) |

Figure 3:
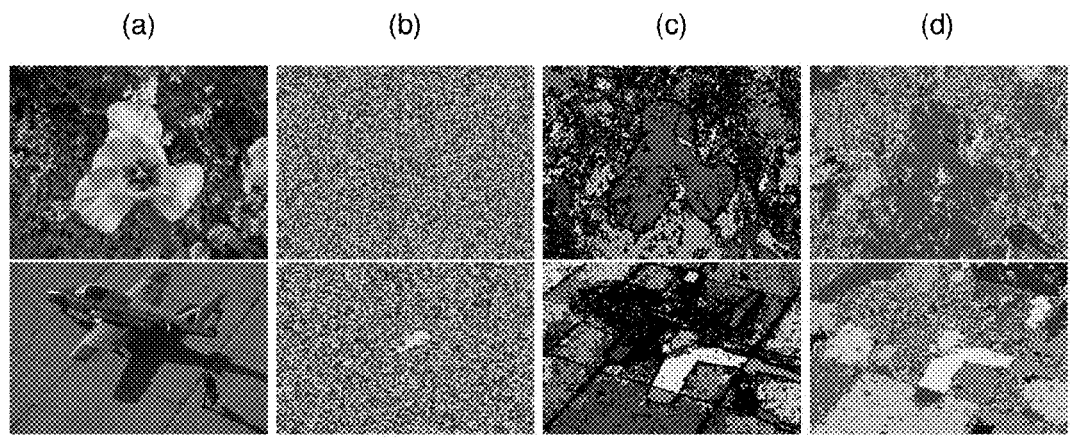
FIG. 3 shows a visual comparison of two examples for different approaches for variable grouping, FIG. 4 visualizes a segmentation error for one image and different budgets.
Figure 4:
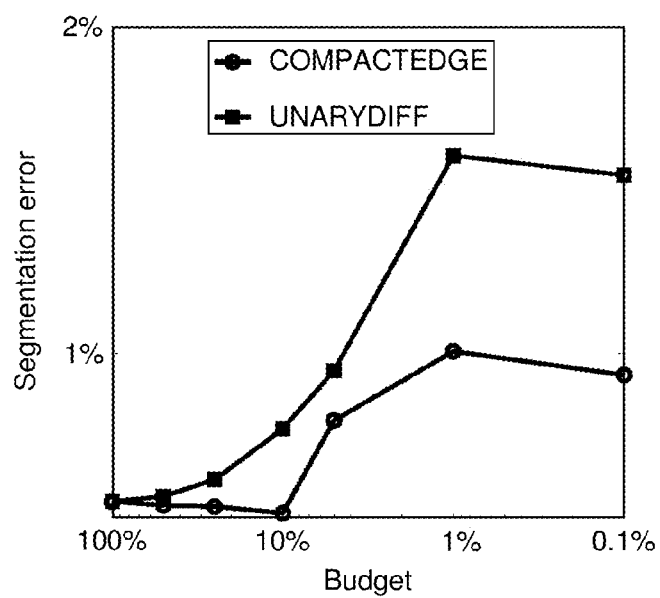

FIG. 3 shows a visual comparison of the different approaches. FIG. 3(a) depicts the original images, FIG. 3(b) depicts the variable grouping using the approach by Kim et al., FIG. 3(c) shows the results of the proposed method using MAXEDGE, and FIG. 3(d) depicts the results of the proposed method using COMPACTEDGE. In contrast to the approach by Kim et al., where the grouping produces superpixels that are comparable in size, the methods proposed herein group large homogeneous regions to single variables.

High-Resolution Images:

To evaluate the segmentation quality and the possible speedup of the proposed method large-scale images with up to 20 MP were used, which were down-sampled to several image-sizes. Similar to the experiments on small-scale images and video sequences the difference in segmentation quality is small and the reduction of runtime is dramatic for large images. As indicated before the BK-algorithm is inefficient and unusable if the graph does not fit into the physical memory. For those large MAP inference problems the ratio of runtime was approximately 0.08 using a budget of 5%. Due to the limitations of the BK-algorithm the proposed method greatly extends its applications.

Video-Sequences:

The proposed algorithm can also be applied to group variables for the problem of video segmentation. To evaluate the performance of the proposed method different video-sequences were segmented, as illustrated in FIGS. 5 to 8.

Figure 5:
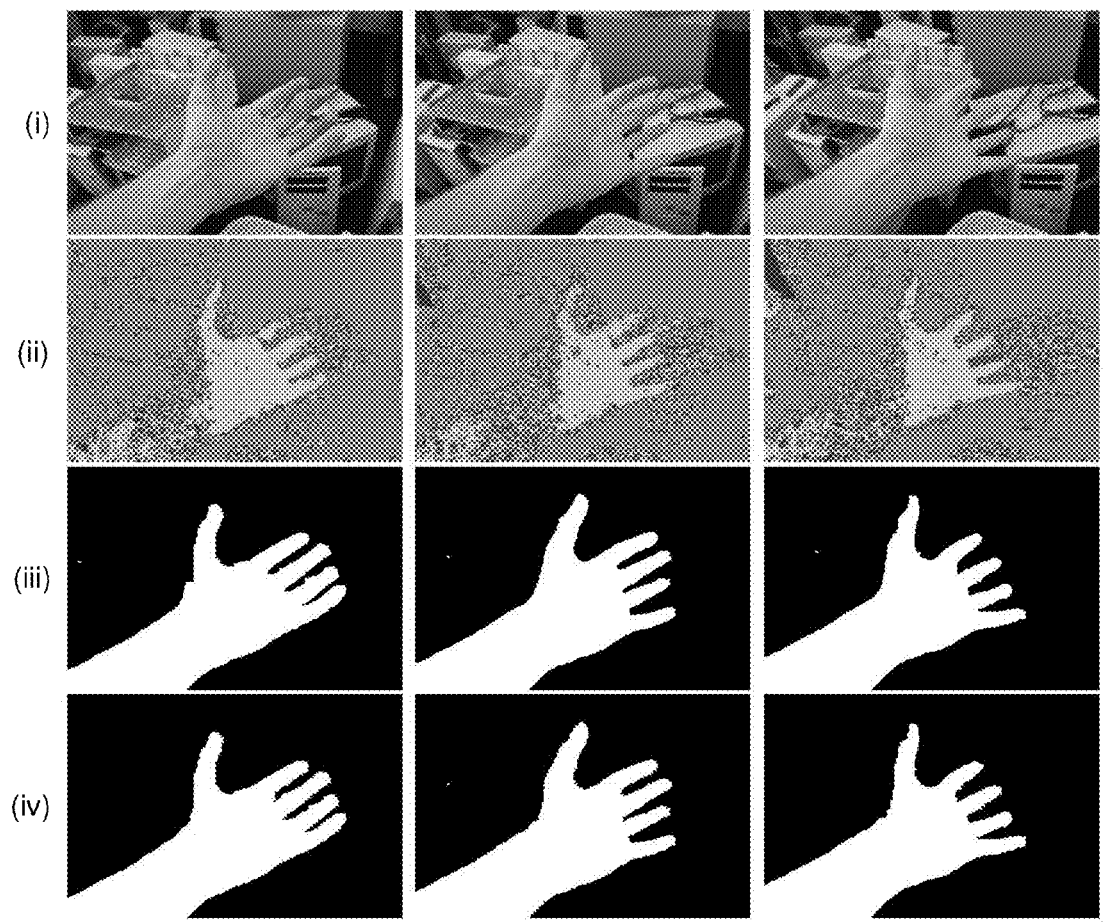
FIG. 5 shows a first example of variable grouping for video segmentation, FIG. 6 visualizes the isosurface of the segmentation of FIG. 5.
Figure 6:
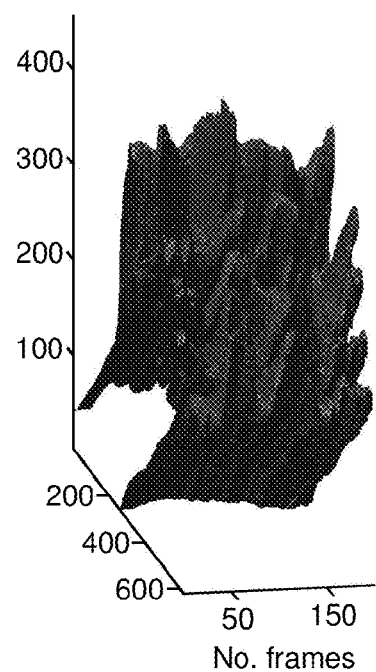

The columns in FIG. 5 correspond to the frames 5, 25 and 38 of a hand sequence. The first row (i) shows the original frames, the second row (ii) the variable grouping with the proposed algorithm. The third row (iii) depicts the segmentation results solving the full MAP, the fourth row (iv) the segmentation results solving the approximated MAP. The segmentation results are almost identical even if the approximated solution used a Budget of 5%. The ratio of runtime for this example is FIG. 6 visualizes the isosurface of the segmentation.

Figure 8:
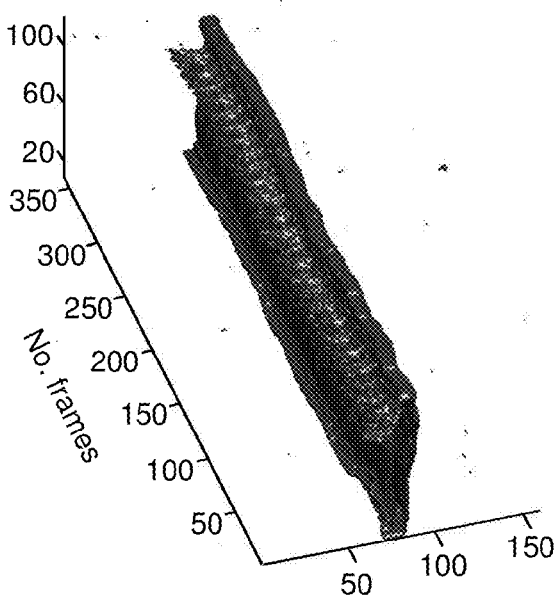
Figure 7:
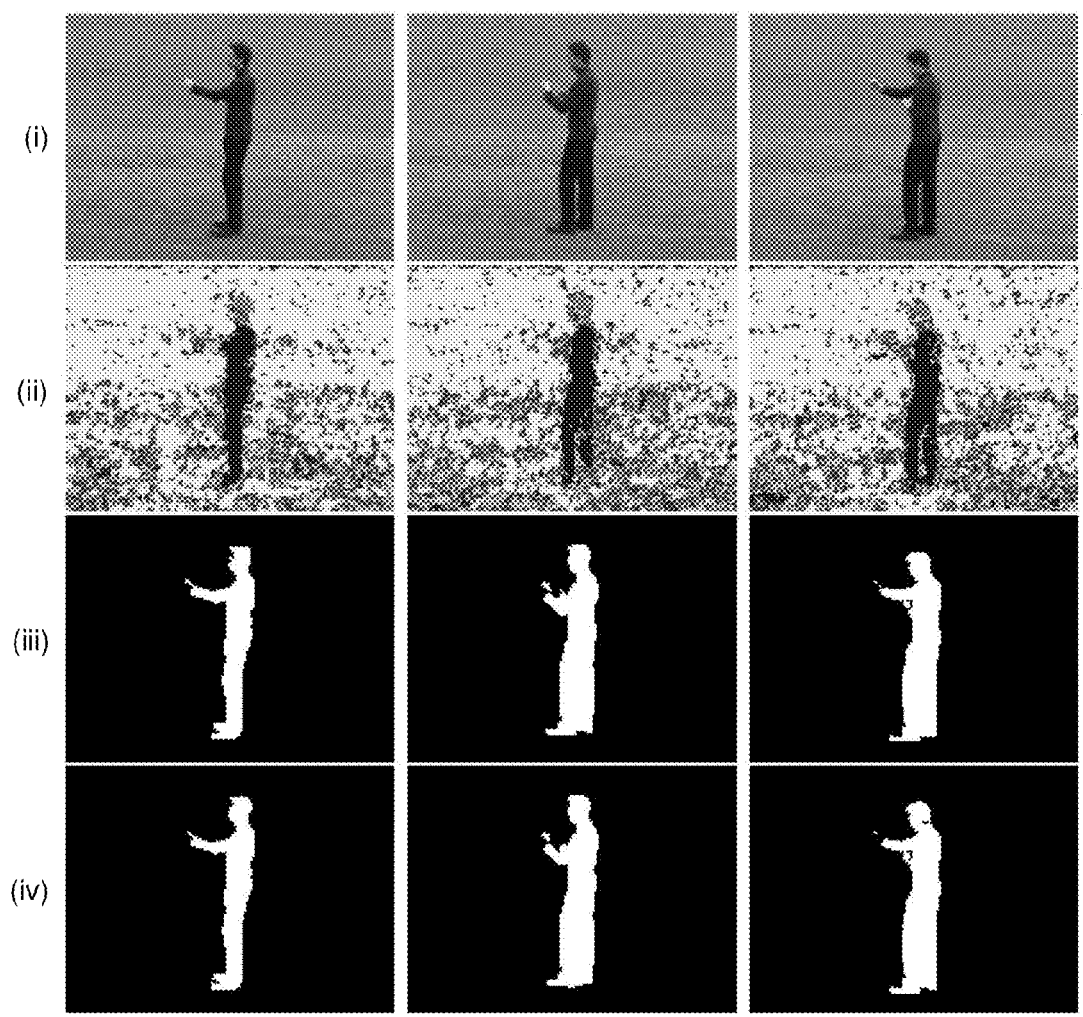
FIG. 7 shows a second example of variable grouping for video segmentation, FIG. 8 visualizes the isosurface of the segmentation of FIG. 7, FIG. 9 schematically illustrates a method according to the invention for multi-label image segmentation.

The columns in FIG. 7 correspond to the frames 10, 220 and 350 of a boxing sequence. The first row (i) shows the original frames, the second row (ii) the variable grouping with the proposed algorithm. The third row (iii) depicts the segmentation results solving the full MAP, the fourth row (iv) the segmentation results solving the approximated MAP. The segmentation results are almost identical even if the approximated solution used a Budget of 10%. The ratio of runtime for this example is ≈0.18. FIG. 8 visualizes the isosurface of the segmentation.

It can be seen from the figures that the proposed algorithm achieves a similar segmentation as the full MAP solution with a much smaller budget and a dramatic reduction of runtime. For example, for the hand video in FIG. 5 (200 frames) the number of variables was reduced from 69.1 million to 3.5 million. For comparison of the results the full MAP solution was only computed for 40 frames since solving the full MAP problem for 100 frames was not possible due to memory reasons. The full MAP problem for the KTH-sequence shown in FIG. 7 has 7 million variables and the results shown use a budget of approximately 10%, resulting in 0.7 million variables with a comparable segmentation result.

Figure 9:
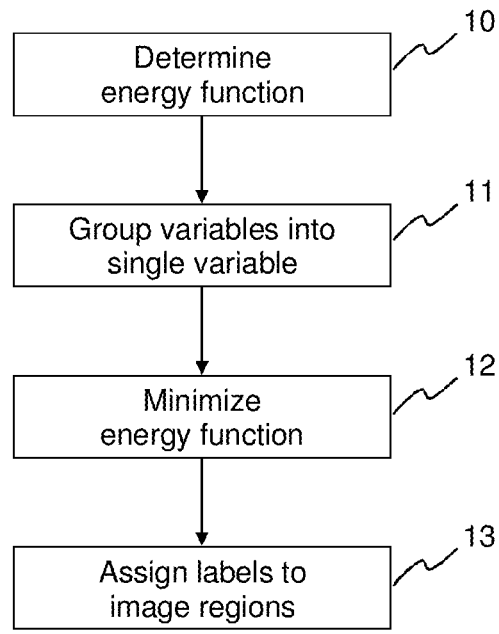

FIG. 9 schematically illustrates a method according to the invention for multi-label image segmentation. In a first step an energy function is determined 10 for the image. Variables of the energy function are then grouped 11 to a single variable for a homogeneous region of the image. Subsequently the energy function is minimized 12 and labels are assigned 13 to regions of the image based on the minimized energy function.

Figure 10:
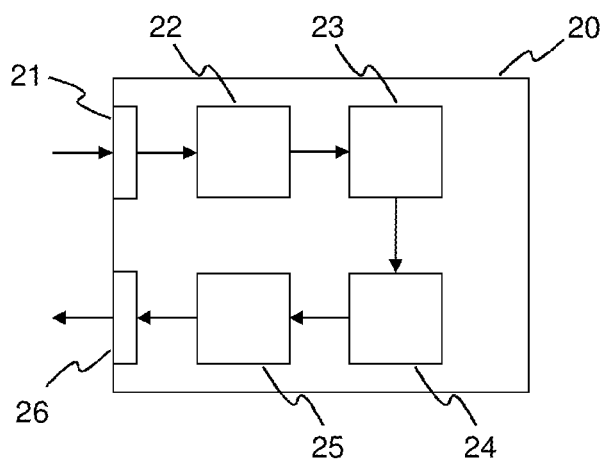
FIG. 10 depicts an apparatus adapted to perform a method according to the invention for multi-label image segmentation.

An apparatus 20 adapted to perform a method according to the invention for multi-label image segmentation is schematically depicted in FIG. 10. The apparatus 20 comprises an energy function determining block 22 for determining 10 an energy function for an image that is received via an input 21. A variable grouping block 23 groups 11 variables of the energy function to a single variable for a homogeneous region of the image. An energy function minimizer 24 minimizes 12 the energy function so that a label assignment block 25 is able to assign 13 labels to regions of the image based on the minimized energy function. Preferably the different blocks are implemented as microprocessors. Of course, two or more of the blocks may likewise be combined into a single processing block. The assigned labels or the image with its assigned labels are made available for further processing via an output 26.

What is claimed is:

1. A method for multi-label segmentation of an image, the method comprising:
   determining an energy function for the image;
   grouping variables of the energy function for a homogeneous region of the image to a single variable;
   minimizing the energy function; and
   assigning labels to regions of the image based on the minimized energy function.

2. The method according to claim 1, wherein the energy function is minimized using a maximum flow algorithm.

3. The method according to claim 1, wherein Dempster's theory of evidence is used to determine which variables and which pixels of the image are grouped.

4. The method according to claim 3, wherein an edge weight function is defined between neighboring pixels of the image based on their appearance similarity and their task specific similarity.

5. The method according to claim 4, wherein the appearance similarity and the task specific similarity are combined using Dempster's rule of combination.

6. The method according to claim 4, wherein two variables of the energy function are grouped if the maximum weight of all edges connected to the two variables is smaller than a threshold.

7. The method according to claim 6, wherein two variables of the energy function are also grouped if the value of the edge connecting the two variables or the maximum value of all edges connected to the two variables is smaller than the minimal internal difference of the two variables.

8. The method according to claim 7, wherein the minimal internal difference of the two variables is defined as the maximum value of the minimal spanning tree plus a small value.

9. The method according to claim 1, wherein Dempster's theory of evidence is used to determine which variables or which pixels of the image are grouped.

10. An apparatus for multi-label segmentation of an image, wherein the apparatus is:
    determining an energy function for the image;
    grouping variables of the energy function for a homogeneous region of the image to a single variable;
    minimizing the energy function; and
    assigning labels to regions of the image based on the minimized energy function.

* * * * *